(12) United States Patent　　(10) Patent No.:　　US 7,543,840 B2
Lin　　(45) Date of Patent:　　Jun. 9, 2009

(54) COLLAPSIBLE GOLF PUSH CART

(76) Inventor: Wen-Tsan Lin, 3R 2th Fl, No. 6, Ta-An West St., Taichung (TW)

( * ) Notice: Subject to any disclaimer, the term of this patent is extended or adjusted under 35 U.S.C. 154(b) by 401 days.

(21) Appl. No.: 11/422,598

(22) Filed: Jun. 7, 2006

(65) Prior Publication Data

US 2007/0284855 A1　　Dec. 13, 2007

(51) Int. Cl.
*B62B 3/02*　　(2006.01)
*B62B 3/12*　　(2006.01)
*B62B 3/10*　　(2006.01)
(52) U.S. Cl. ............... 280/639; 280/638; 280/642; 280/38; 280/651; 280/655
(58) Field of Classification Search ............... 280/639, 280/640, 37, 38, 39, 40, 641, 642, 643, 644, 280/645, 646, 42, 647, 648, 649, 650, 651, 280/652, 653, 654, 655, 655.1, 47.26, 47.24, 280/DIG. 6; 292/254; 206/315.3
See application file for complete search history.

(56) References Cited

U.S. PATENT DOCUMENTS 1,968,285 A * 7/1934 Egan ..................... 292/172
6,435,539 B1 * 8/2002 Wu ........................ 280/652
6,886,852 B2 * 5/2005 Cheng et al. ............. 280/651

* cited by examiner

*Primary Examiner*—Christopher P Ellis
*Assistant Examiner*—Bryan A Evans

(57) ABSTRACT

A collapsible golf push cart includes a main frame having an upper frame, a lower frame, a rear wheel frame and two rear wheels rotatably mounted to the rear wheel frame respectively, at least a joint mechanism having at least a first joint member and at least a second joint member, the first and second joint members being connected with the lower and upper frames respectively, and a clasp member having a male clasp and a female clasp engaging with the first and second joint members respectively. The male clasp defines a block and a control mechanism for controlling the block, and the female clasp defines a notch to accommodate the block. The control mechanism causes the block to extend or retract to fix or release the clasp member for making the golf push cart in an extended or a collapsed position.

7 Claims, 8 Drawing Sheets

COLLAPSIBLE GOLF PUSH CART

BACKGROUND

The present invention relates to golf carts, and more particularly to a collapsible golf push cart, which can be conveniently carried and placed.

Generally, golfers may have a large selection of clubs to use for every foreseeable occasion, and consequently, the golf bag and its collection of clubs may become heavy and cumbersome to carry around the golf course. One answer to this problem has been the golf push cart, to which the bag can be strapped, thus relieving the golfer of the burden of carrying his collection of clubs upon his shoulders.

Typical golf push carts adopt fixative configuration, which make the carrying and placing process unduly burdensome due to the enormous volume thereof. Another fairly recent trend in golf push carts is for carts that are able to collapse or fold. However, those golf push carts are commonly inconveniently and difficulty in operation.

Accordingly, what is needed is a golf push cart that can overcome the above-described deficiencies.

BRIEF SUMMARY

Accordingly, the present invention is to provide a collapsible golf cart, which is facility and conveniently in operation.

An exemplary collapsible golf cart includes a main frame having an upper frame, a lower frame, a rear wheel frame, and two rear wheels rotatably mounted to the rear wheel frame respectively; at least a joint mechanism having at least a first joint member and at least a second joint member, the first and second joint members being connected with the lower and upper frames respectively; and a clasp member having a male clasp and a female clasp engaging with the first and second joint members respectively. The male clasp defines a block and a control mechanism for controlling the block, and the female clasp defines a notch to accommodate the block.

The control mechanism causes the block to extend or retract to fix or release the clasp member for making the golf push cart in an extended or a collapsed position.

Other advantages and novel features will become more apparent from the following detailed description when taken in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
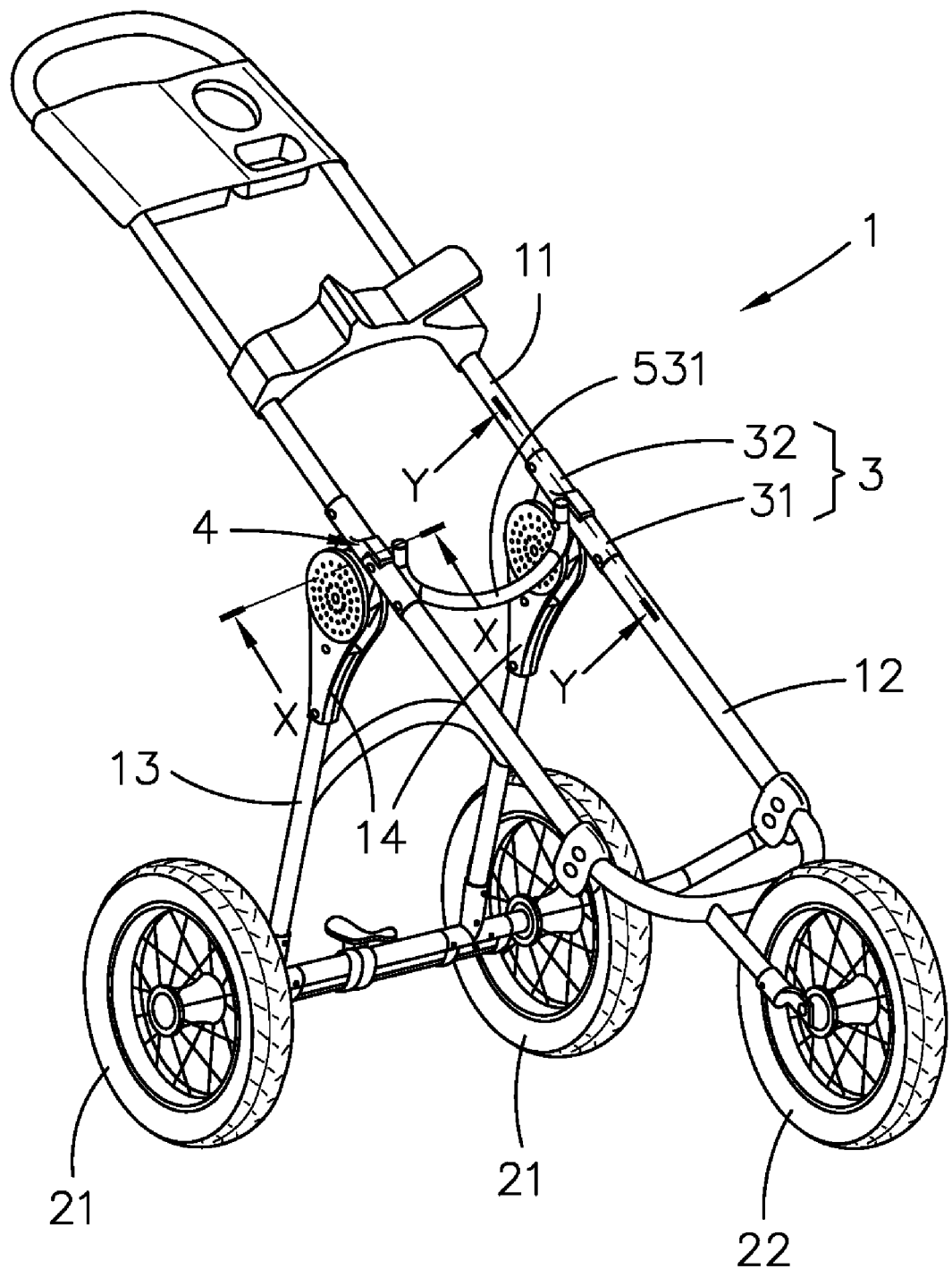
FIG. 1 is a schematic, perspective view of a golf push cart, showing the golf push cart in an extended position.
Figure 2:
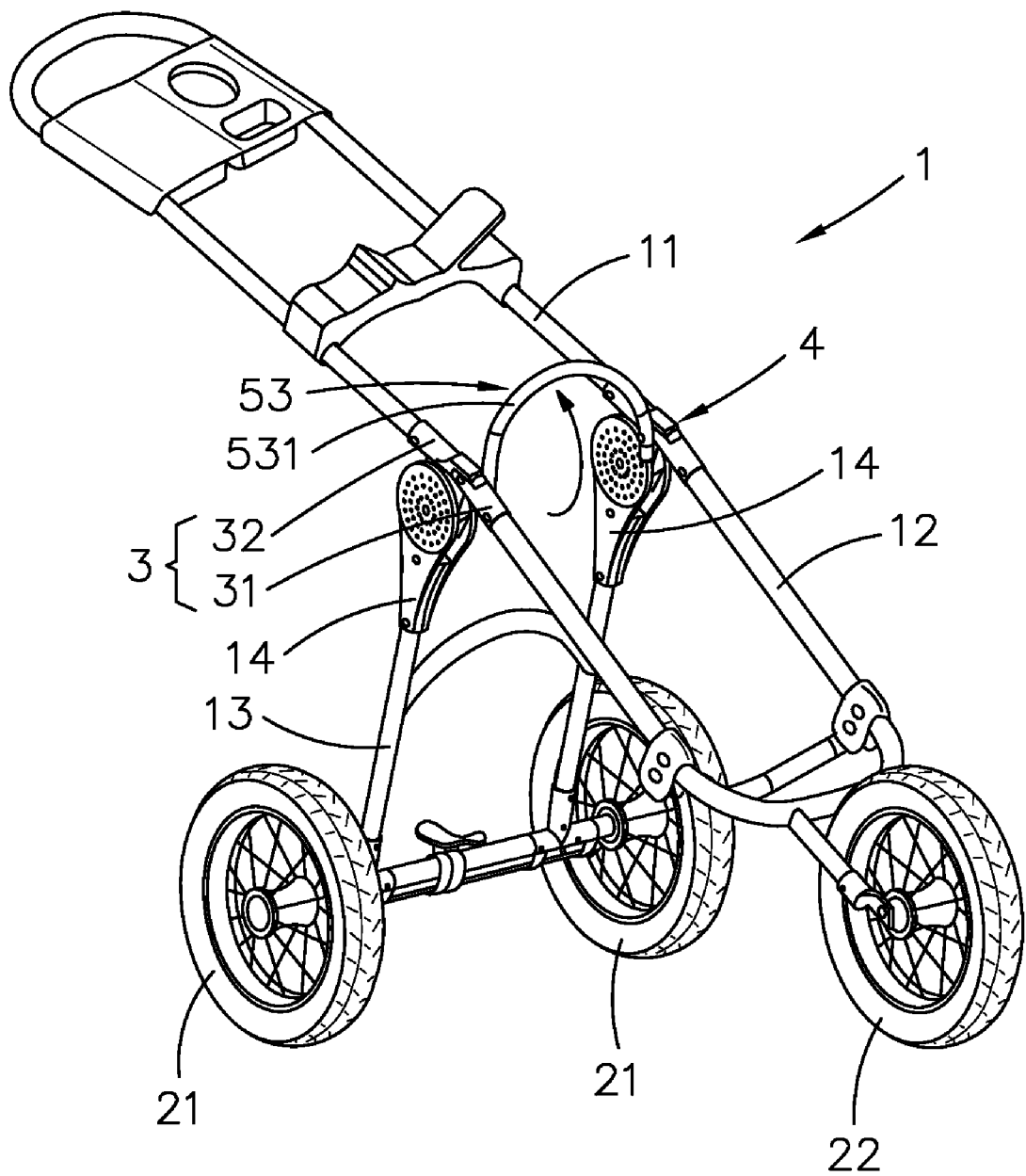
FIG. 2 is a schematic, perspective view of the golf push cart of FIG. 1, showing the golf push cart being collapsed.
Figure 3:
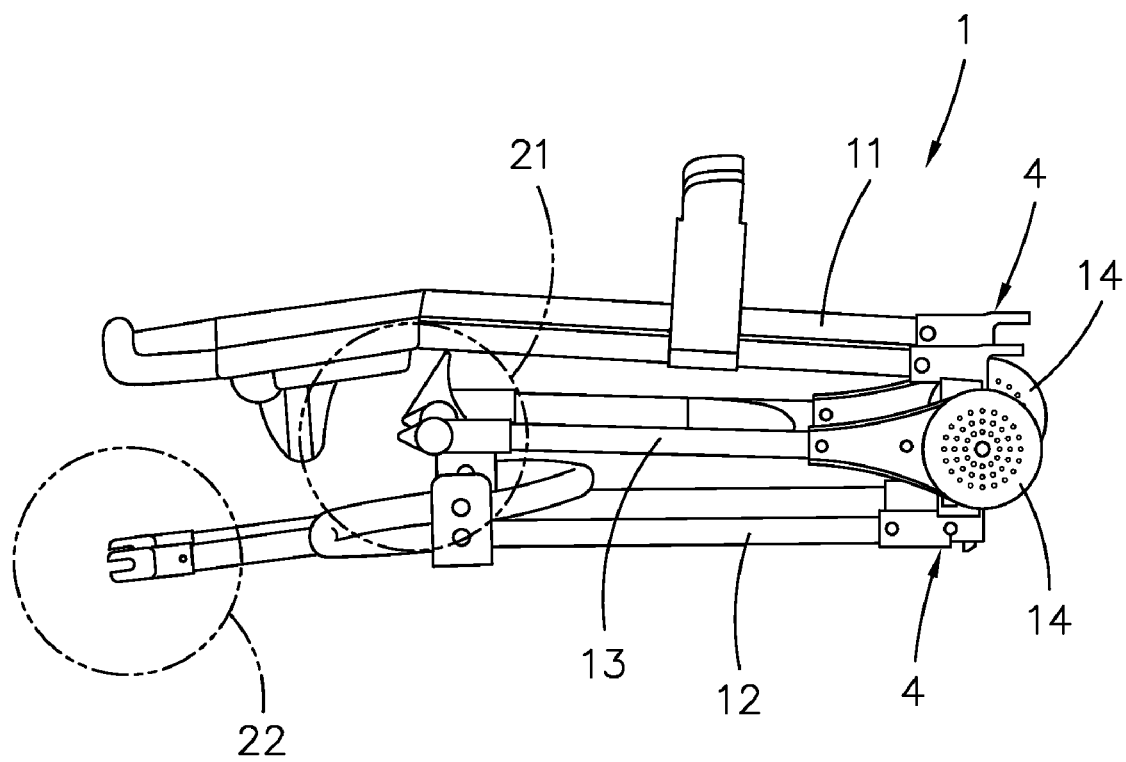
FIG. 3 is a schematic, perspective view of the golf push cart of FIG. 1, showing the golf push cart in a collapsed position.

Referring to FIGS. 1-3, a golf push cart includes a main frame 1, a joint mechanism 3, a clasp member 4, and a control mechanism 5. The main frame 1 includes an upper frame 11, a lower frame 12, a rear wheel frame 13, and two rear wheels 21 rotatably mounted to the rear wheel frame 13 respectively. The rear wheel frame 13 engages with the joint mechanism 3 via a connecting member 14. The joint mechanism 3 includes a first joint member 31 and a second joint member 32, and the first and second joint members 31 and 32 engage with the lower and upper frames 12 and 11 respectively. For conveniently operating, a front wheel 22 is employed, which is rotatably mounted to an end portion of the lower frame 12.

FIG. 1 shows the golf push cart in an extended position, in which the clasp member 4 is fixed. FIG. 2 shows the golf push cart being folded via operating a handle 531 of the control mechanism 5. FIG. 3 shows the golf push cart in a collapsed position, in which the upper frame 11 and the lower frame 12 are reversely rotated relative to the clasp member 4. The detail collapse action will be described as below.

Figure 4:
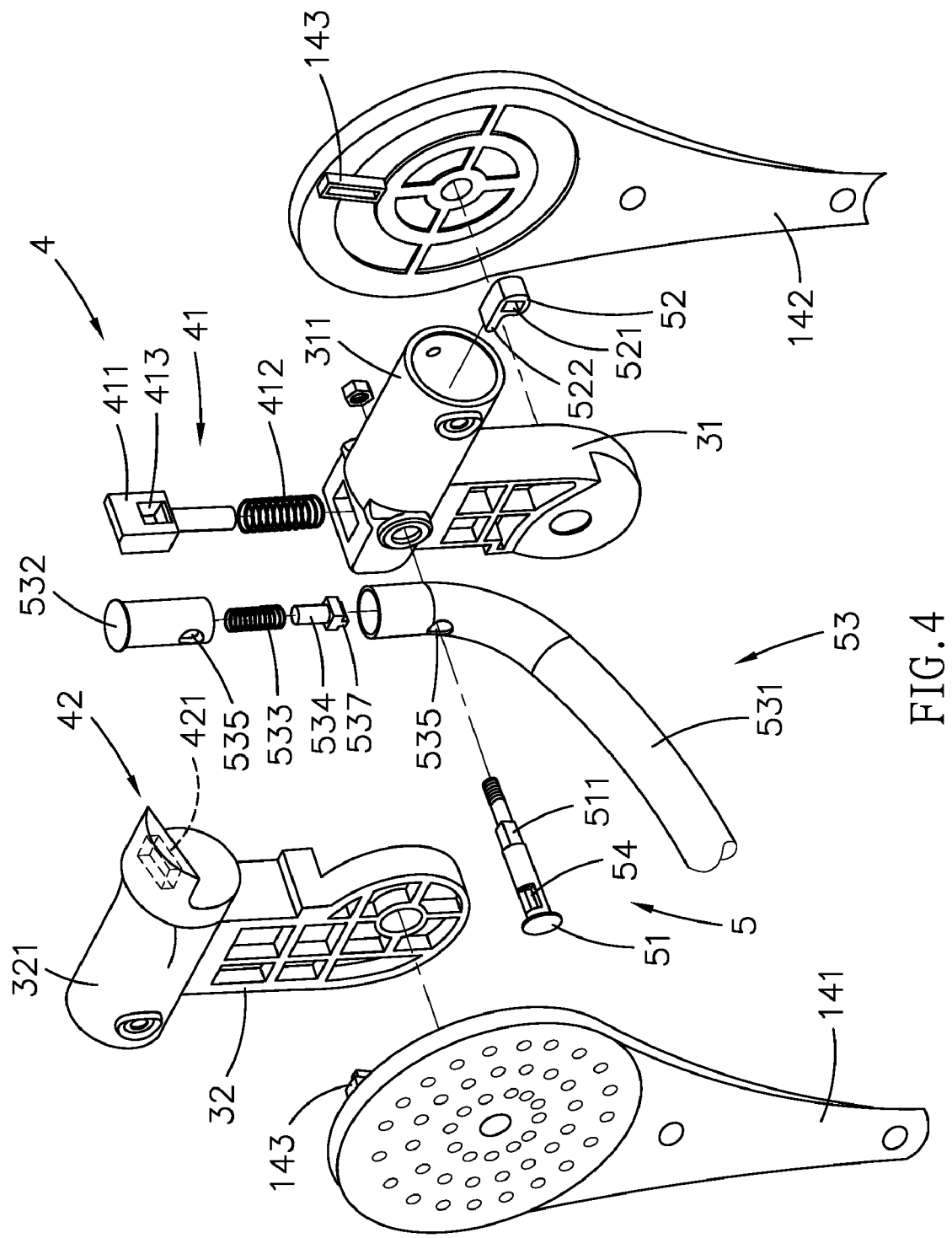
FIG. 4 is a schematic, exploded view of part of a joint mechanism, a clasp member, and a control mechanism that are employed in the golf push cart of FIG. 1.

Referring to FIG. 4, the connecting member 14 includes a first pivot piece 141, and a second pivot piece 142 disposed opposite to the first pivot piece 141. The connecting member 14 further includes a blocking member 143 disposed between the first and second pivot pieces 141 and 142, and the blocking member 143 disposed between the first and second joint members 31 and 32 while the connecting member 14 engages with the joint mechanism 3.

The joint mechanism 3 includes a first and a second joint member 31 and 32, and each of the joint members 31 and 32 includes a joint portion 311 and 321 for engaging with the lower frame 12 and the upper frame 11, respectively.

The clasp member 4 includes a male clasp 41 and a female clasp 42, which are oppositely disposed. Moreover, the male clasp 41 includes a block 411, and a handle mechanism 5 for controlling the block 411. The block 411 defines a notch 413 at a side thereof, and a spring 412 nests and abuts a bottom portion of the block 411 to make the block 411 extend out of the first joint member 31. The female clasp 42 includes a notch 421 for accommodating a top portion of the block 411 therein.

The control mechanism 5 includes a bolt 51, a pivot mechanism 52, and a handle mechanism 53. The bolt 51 includes a notch 54 and a connecting bar 511 thereof. The pivot mechanism 52 includes a through hole 521 and a pivot portion 522. The handle mechanism 53 includes a handle 531, and a stopper 532 nested in the handle 531. The handle mechanism 53 further includes an elastic element 533 and an abutting element 534 accommodated in the stopper 532. The abutting element 534 defines a tenon 537 at a bottom portion thereof. Both the handle 531 and the stopper 532 includes through holes 535 therein.

Figure 8:
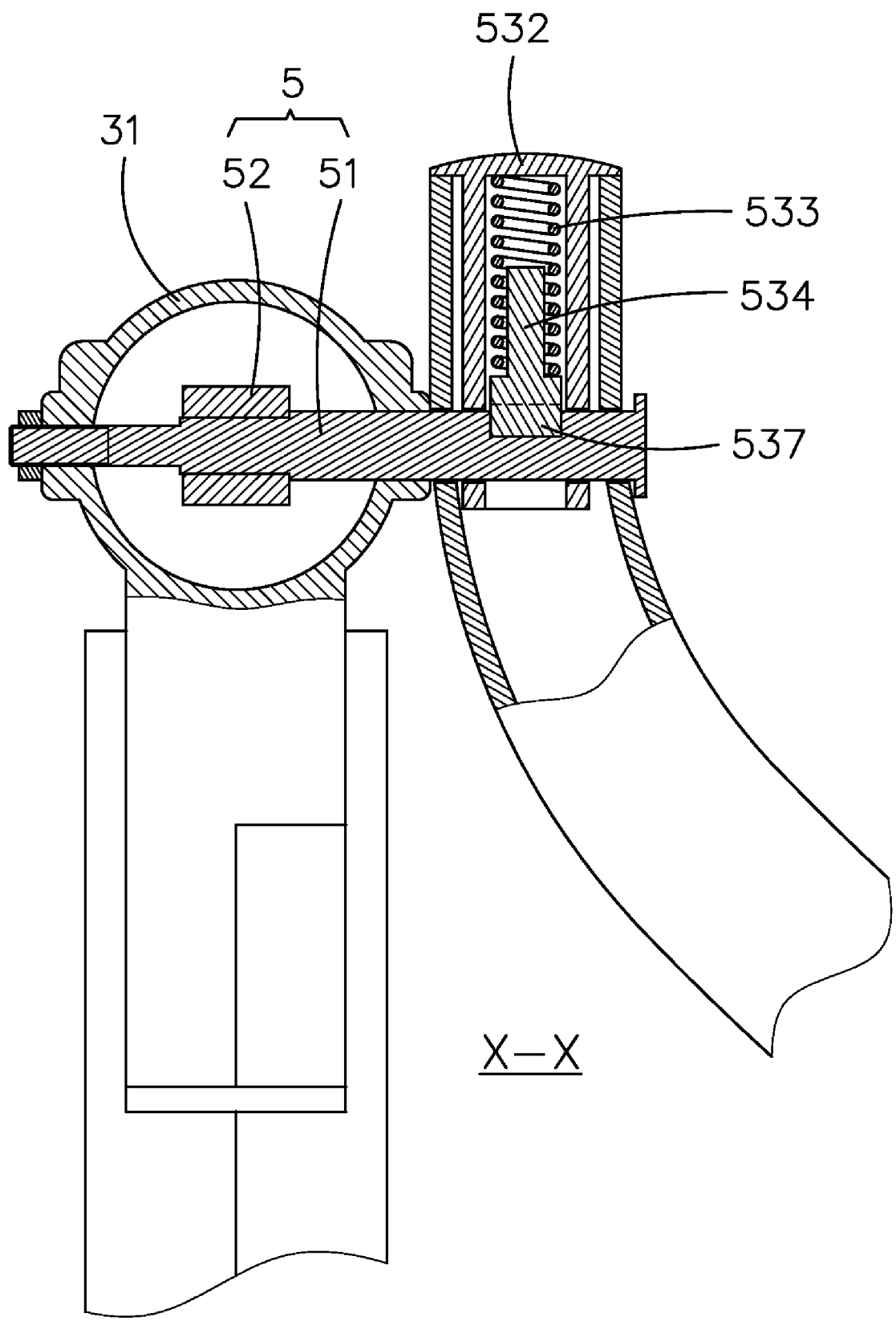
FIG. 8 is a schematic, cross-sectional view taken along line X-X of FIG. 1.

In assembly, the first and second joint members 31 and 32 engage with the lower and upper frames 12 and 11 via the joint portion 311 and 321, respectively. The male clasp 41 and the female clasp 42 engage with the first and second joint members 31 and 32 respectively The top portion of the block 411 of the male clasp 41 is accommodated in the notch 421 of the female clasp 42. The spring 412 abuts the block 411 and makes it steadily fix to the female clasp 42. The pivot portion 522 of the pivot mechanism 52 is inserted into the notch 413 of the block 411. Also referring to FIG. 8, the bolt 51 is inserted into the through holes 535 of the handle 531 and the stopper 532, and is fixed to the first joint member 31. The connecting bar 511 of the bolt 51 is engaged in the through hole 521 of the pivot mechanism 52, and the tenon 537 of the abutting element 534 and the elastic element 533 cooperatively to press the notch 54 of the bolt 51, so as to make the bolt 51 steadily fix to handle 531.

Figure 5:
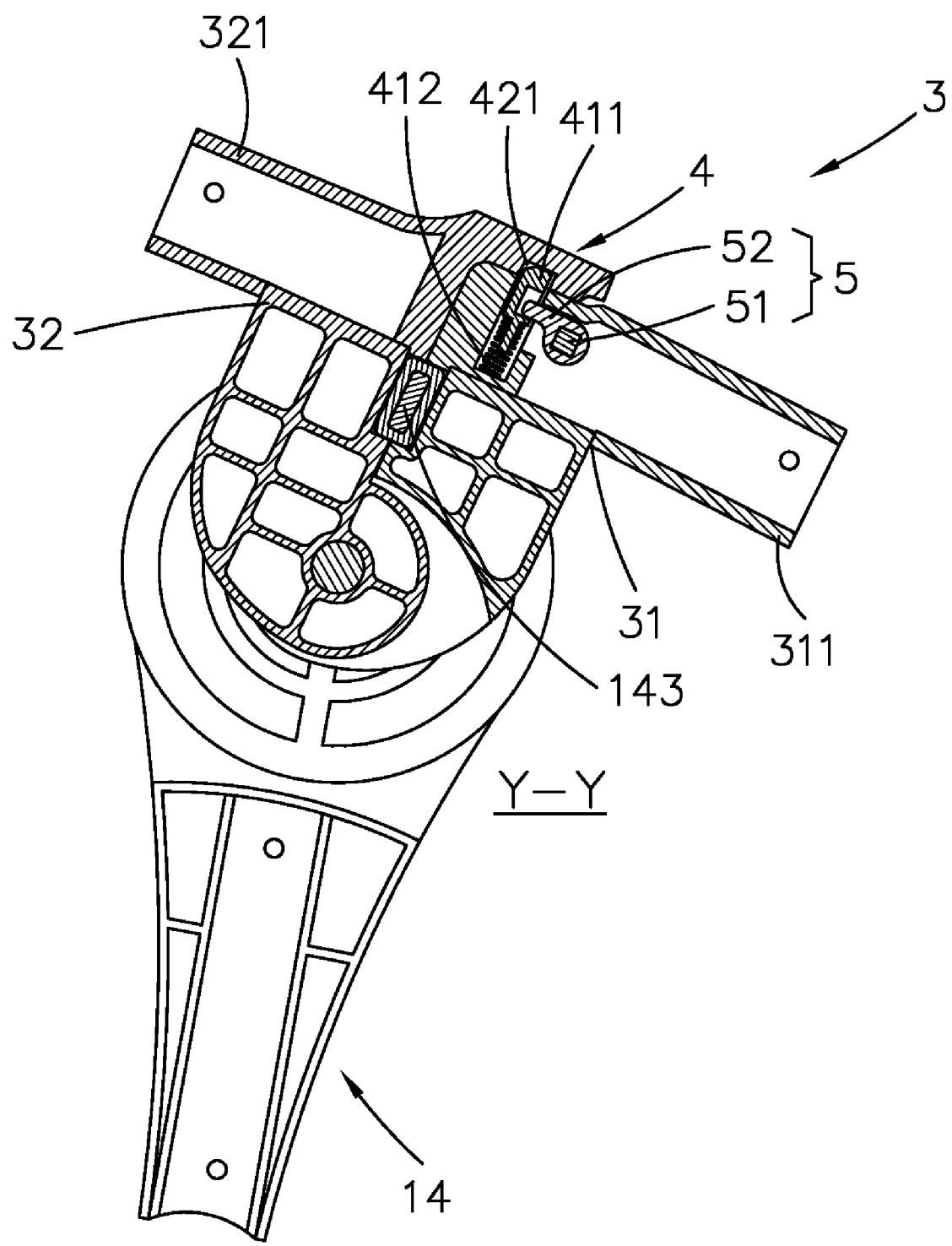
FIG. 5 is a schematic, cross-sectional view taken along line Y-Y of FIG. 1, showing a block of the clasp member being abutted.

With this configuration, it is with facility and convenient to collapse or extend the golf push cart. Referring to FIG. 5, the block 411 is fixed in the notch 421 via abutting by the spring 412. Therefore, the clasp member 4 is fixed so as to maintain the golf push cart in the extended position.

Figure 6:
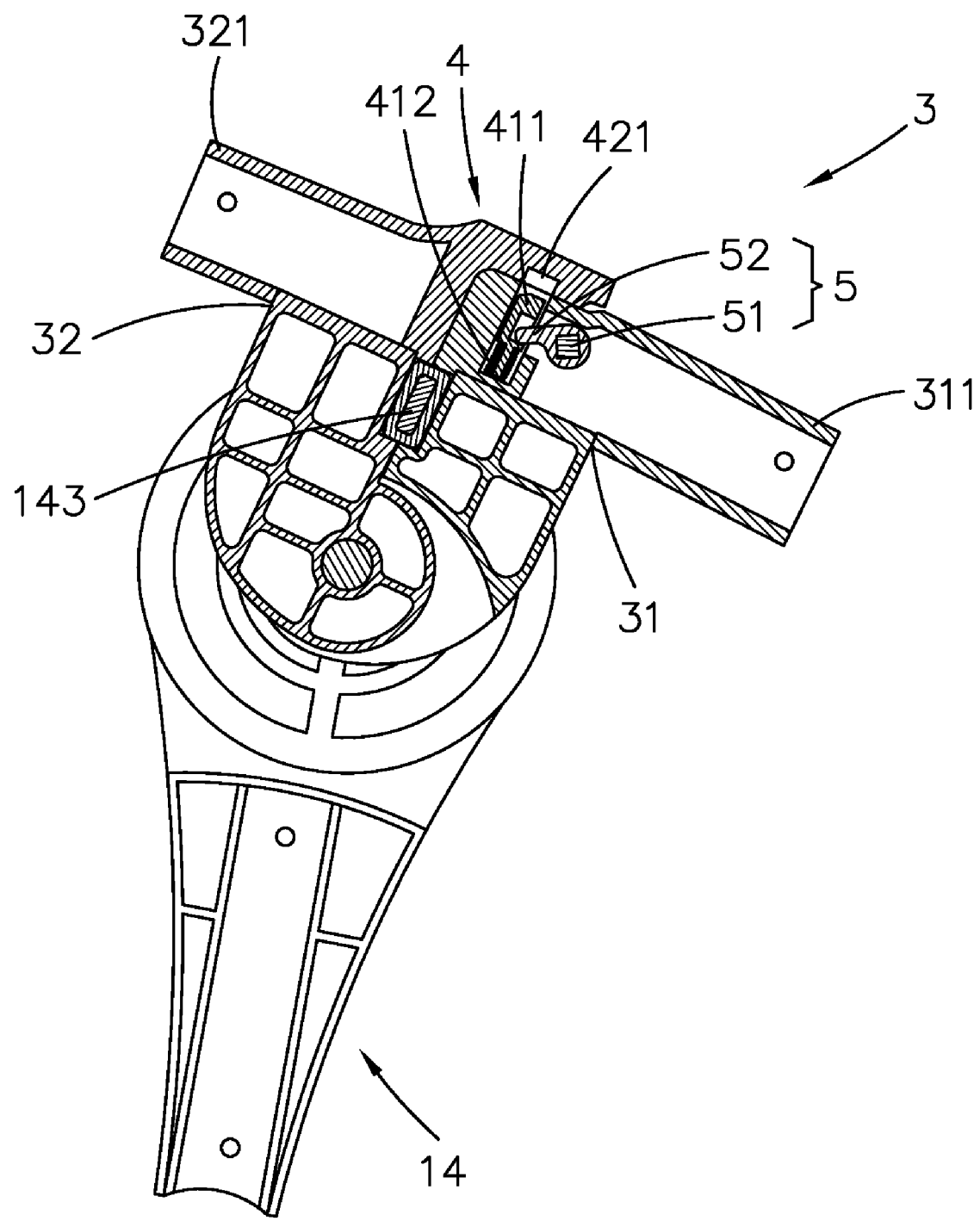
FIG. 6 is another schematic, cross-sectional view of FIG. 5; showing the block being retracted into the joint mechanism.
Figure 7:
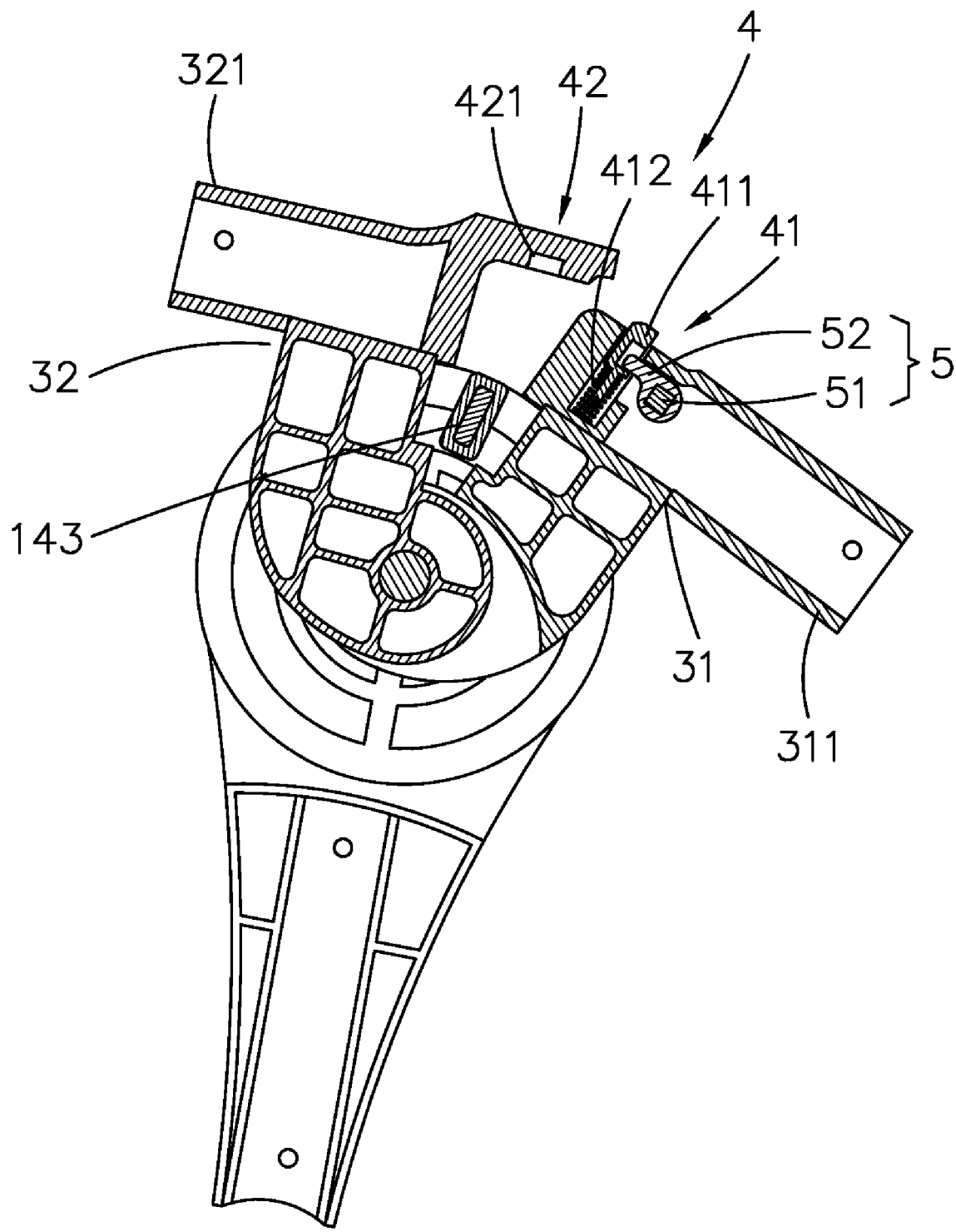
FIG. 7 is another schematic, cross-sectional view of FIG. 5; showing the joint mechanism in a detached position.

When collapsing the golf push cart, referring to FIGS. 6-7, user can rotate the handle 531 to cause the bolt 51 to rotate to drive the pivot portion 522 of the pivot mechanism 52 downwardly pressing on the block 411 for retracting the block 411. Then the male clasp 41 and the female clasp 42 are detached, so as to release the clasp member 4. After that, the user may collapse the golf push cart (shown in FIG. 3) via reversely rotating the upper frame 11 and the lower frame 12 relative to the clasp member 4. This operation is with facility and convenient.

In reverse case for extending the golf push cart, it just needs to rotate the upper and lower frame 11 and 12 to press down the block 411, and then make the block 411 and the notch 421 re-engage with each other to fix the male clasp 411 and the female clasp 412 of the clasp member 4.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A golf push cart, comprising:
    a main frame comprising an upper frame, a lower frame, a rear wheel frame, and two rear wheels rotatably mounted to the rear wheel frame respectively;
    at least a joint mechanism comprising at least a first joint member and at least second joint member, the first and second joint members connecting with the lower and the upper frames respectively; and
    a clasp member comprising a male clasp and a female clasp engaging with the first and the second joint members respectively, the male clasp including a block and a control mechanism for controlling the block, and the female clasp including a notch to accommodate the block,
    wherein the control mechanism causes the block to extend to fix or retract to release the clasp member for making the golf push cart in an extended position or a collapsed position,
    wherein the male clasp further comprises a spring, the spring abuts the block to extend out of the first joint member, the control mechanism comprises a bolt, and a pivot mechanism engaged with the bolt and the block, the bolt rotates to cause the pivot mechanism to drive the male clasp induce the block to retract back into the joint member via pressing on the spring, the bolt being set free causes the spring be released to abut the block to extend out of the first joint member again, and,
    wherein the control mechanism includes a handle mechanism for making the golf push cart in the extended position or the collapsed position, which includes a handle, and a stopper nested in an end portion of the handle, the stopper includes an elastic element and an abutting element, both the handle and the stopper respectively include a through hole, and the bolt is inserted into the through holes of the handle and the stopper and abutting by the elastic element and the abutting element, which is steadily relative to the handle.

2. The golf push cart as claimed in claim 1, wherein the bolt includes a connecting bar, the pivot mechanism includes a through hole, and the connecting bar is inserted into the through hole to make the bolt engage with the pivot mechanism.

3. The golf push cart as claimed in claim 1, wherein the pivot mechanism includes a pivot portion, and the block includes a notch to accommodate the pivot portion.

4. The golf push cart as claimed in claim 1, wherein the bolt includes a notch thereof, and the abutting element includes a tenon pressed on the notch.

5. The golf push cart as claimed in claim 1, wherein the rear wheel frame is engaged with the joint mechanism via a connecting member, which includes a first pivot piece, a second pivot piece disposed opposite to the first pivot piece, and a blocking member disposed between the first and the second pivot pieces, the blocking member is disposed between the first and the second joint members while the connecting member engages with the joint mechanism.

6. The golf push cart as claimed in claim 1, wherein each of the first and the second joint members includes a joint portion for respectively engaging with the lower and the upper frames.

7. The golf push cart as claimed in claim 1, further comprising a front wheel, rotatably mounted to an end portion of the lower frame.

* * * * *